(12) United States Patent
Röckl et al.

(10) Patent No.: US 9,752,647 B2
(45) Date of Patent: Sep. 5, 2017

(54) ADDITIONAL WEIGHT FOR A WHEEL

(71) Applicant: Deere & Company, Moline, IL (US)

(72) Inventors: Michael Röckl, Mannheim (DE); Dipak Jadhav, Shirol (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/228,797

(22) Filed: Aug. 4, 2016

(65) Prior Publication Data
US 2016/0341276 A1 Nov. 24, 2016

Related U.S. Application Data

(63) Continuation of application No. PCT/EP2015/051932, filed on Jan. 30, 2015.

(30) Foreign Application Priority Data

Feb. 5, 2014 (DE) .................. 10 2014 202 074

(51) Int. Cl.
*F16F 15/32* (2006.01)
*B60B 15/28* (2006.01)
(Continued)

(52) U.S. Cl.
CPC ............ *F16F 15/324* (2013.01); *B60B 15/28* (2013.01); *B62D 49/0621* (2013.01);
(Continued)

(58) Field of Classification Search
CPC ........ F16F 15/324; F16F 15/322; F16F 15/34; F16F 2230/0011; B62D 49/0621; B60B 15/28
See application file for complete search history.

(56) References Cited

U.S. PATENT DOCUMENTS 2,243,380 A * 5/1941 Kinney .................. B60B 15/28
301/11.1
2,859,065 A * 11/1958 Darby ..................... B60B 15/28
301/53.5
(Continued)

FOREIGN PATENT DOCUMENTS

DE 1279496 B 10/1968
EP 2676807 A1 12/2013

OTHER PUBLICATIONS

The International Preliminary Report on Patentability issued in counterpart application No. PCT/EP2015/051932, dated Aug. 18, 2016 (14 pages).

*Primary Examiner* — Darlene P Condra

(57) ABSTRACT

An additional weight for a wheel for ballasting a drive axle of a working machine includes a first loading disk centrally connected to the drive axle and a second loading disk connected to the first loading disk. The first loading disk has a conical abutment face for pre-positioning the second loading disk relative to the first loading disk. The first and the second loading disks form encoding formations for mutually centering on end faces which face each other and which are in engagement with each other in a connected state of the loading disks. At least one of the end faces of at least one of the loading disks forms a spacer dome. In the connected state, the spacer dome contacts an end face of the other loading disk in order to position the first and the second loading disks with respect to each other in an axial direction.

5 Claims, 6 Drawing Sheets

(51) Int. Cl.
*F16F 15/34* (2006.01)
*B62D 49/06* (2006.01)
(52) U.S. Cl.
CPC ............ *F16F 15/322* (2013.01); *F16F 15/34* (2013.01); *F16F 2230/0011* (2013.01)

(56) References Cited

U.S. PATENT DOCUMENTS

| | | | | |
|---|---|---|---|---|
| 3,644,002 | A * | 2/1972 | Barth | B60B 15/28 |
| | | | | 301/53.5 |
| 5,116,106 | A * | 5/1992 | Hardesty | F16F 15/34 |
| | | | | 301/53.5 |
| 5,873,636 | A * | 2/1999 | Messina | B60B 3/00 |
| | | | | 301/5.21 |
| 8,944,521 | B2 | 2/2015 | Roth et al. | |
| 2001/0011842 | A1* | 8/2001 | Rockl | B60B 3/12 |
| | | | | 301/35.632 |
| 2010/0231030 | A1* | 9/2010 | Eaton | A63H 17/262 |
| | | | | 301/53.5 |
| 2013/0342002 | A1* | 12/2013 | Roth | B60B 15/28 |
| | | | | 301/53.5 |

* cited by examiner

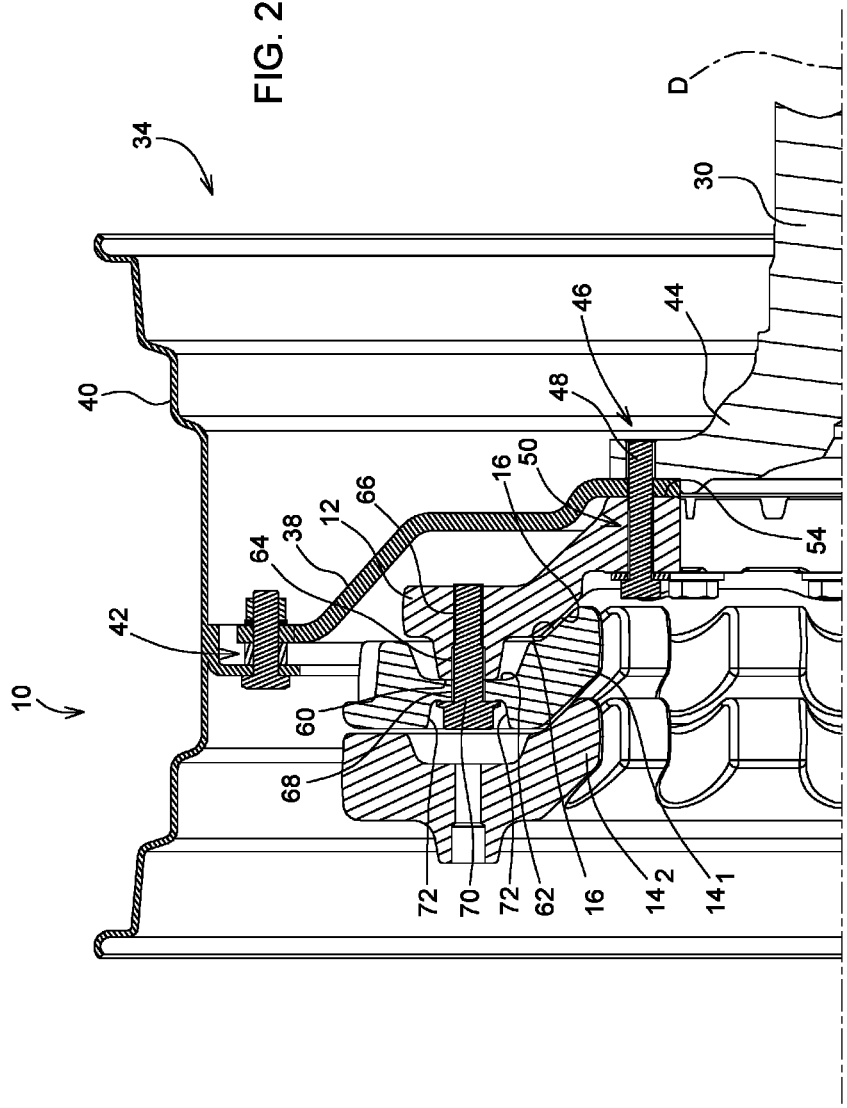

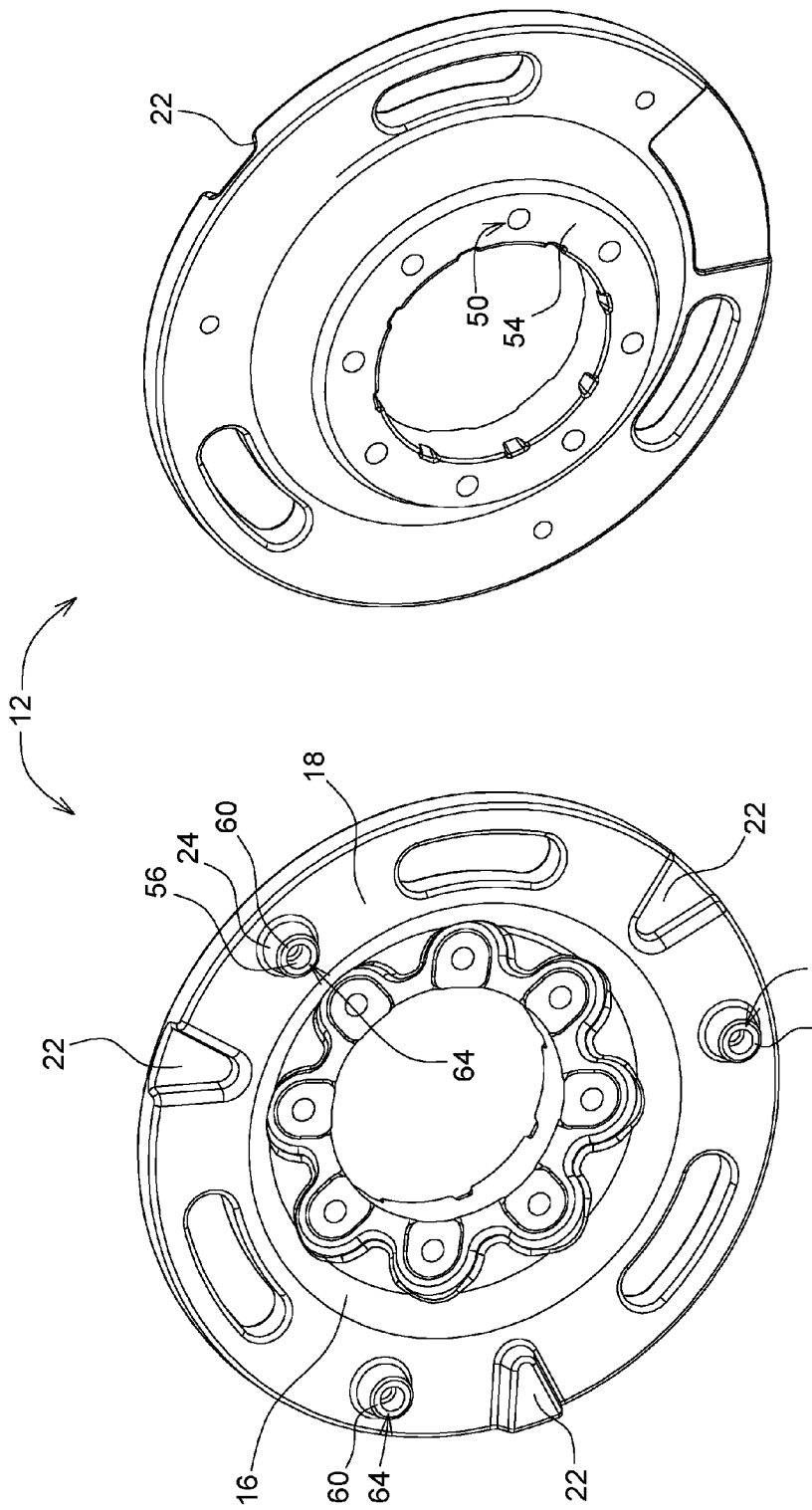

ADDITIONAL WEIGHT FOR A WHEEL

RELATED APPLICATION

This application is a continuation application of International Application Ser. No. PCT/EP2015/051932, which has an international filing date of Jan. 30, 2015 and designates the United States of America, and which claims the benefit of German Application Ser. No. 102014202074.3, filed on Feb. 5, 2014. The disclosures of these aforementioned applications are hereby expressly incorporated by reference in their entirety.

FIELD OF THE DISCLOSURE

The present disclosure relates to an agricultural working machine, and in particular to an additional weight for a wheel for ballasting a drive axle of an agricultural working machine.

BACKGROUND

Conventional vehicles may provide an additional weight for securing to a wheel disk of vehicle wheels. An intermediate disk is provided for securing to the wheel disk. The intermediate disk forms an outer conical face for receiving a weight disk which itself forms an internal conical face. Unintentional rotation of the weight disk with respect to an intermediate disk is prevented by means of a cam and a recess which are each arranged on the intermediate disk and the weight disk. By means of a centrally arranged screw, the weight disk is secured relative to the intermediate disk. In spite of the conical receiving of the two disks relative to each other, it is possible for the weight disk to be secured eccentrically with respect to the intermediate disk, resulting in increased wheel imbalance. The wheel imbalance results at high travel speed, for example, at the transport speed of an agricultural tractor, to losses of comfort.

SUMMARY

In this disclosure, an additional weight for a wheel for ballasting a drive axle of an agricultural working machine includes a first loading disk which can be centrally connected to the drive axle and which acts as an adapter element. In addition, at least one second loading disk can be connected where applicable to the first loading disk, wherein the first loading disk has a conical abutment face for pre-positioning the second loading disk relative to the first loading disk. The first and the second loading disks form encoding formations which are for mutual centering on end faces which face each other and are in engagement with each other in a connected state of the loading disks. At least one of the end faces of at least one of the loading disks forms spacer domes which, in the connected state, contact an end face of the other loading disk in order to position the first and the second loading disks with respect to each other in an axial direction.

As a result of the construction of the additional weight for a wheel it is ensured that, during the assembly of the second loading disk on the first loading disk which acts as an adapter element with respect to the wheel disk, a pre-positioning can be carried out via the conical step of the first loading disk. The second loading disk has a counter-conical step which serves to abut the conical step of the first loading disk. During the subsequent assembly of the second loading disk, there is carried out via the encoding formations a centering of the second loading disk in a radial direction with respect to the first loading disk. The assembly of the second loading disk is completed when, via the abutment of the spacer domes, a positioning or fixing of the first loading disk with respect to the second loading disk is carried out so that a wobbling of the loading disk in the event of rotation is thereby prevented.

In another embodiment of the additional weight for a wheel, there are provided spacer domes at an end face of one of the two loading disks. In one example, there may be three spacer domes. On an end face of the other loading disk, abutment faces for the abutment of the spacer domes are constructed. In principle, the end faces of the spacer domes afford the possibility of being processed so that a precisely fitting and wobble-free positioning of the two loading disks with respect to each other in an axial direction can thereby be ensured.

The first and second loading disks form on at least one of the end faces spacer domes via which the loading disks contact each other in the connected state. This results overall in a simplification during the production and the assembly of the loading disks.

The encoding formations in the end faces form a triangular shape. As a result of the triangular shape, it is ensured that the encoding formations on the opposing end faces of the loading disks can be readily found and fit one in the other during assembly.

Three encoding formations are provided over the periphery of the end face of a loading disk. It is thereby ensured that the most precise positioning possible of the two loading disks relative to each other in a radial direction can be carried out.

The encoding formations on the end face of a loading disk are constructed partially as recesses and partially as protrusions. It is thereby ensured that two loading disks can be mounted only in a peripheral position relative to each other.

A through-hole extends through the spacer domes. The possibility is thereby retained of guiding a securing means, for example, in the form of threaded pins through the through-hole in order to consequently retain the loading disks against each other.

The first loading disk has a securing hole circle for securing to a wheel flange of the drive axle. It is thereby ensured that the additional weight for the wheel is not connected to the drive axle indirectly by means of the wheel disk, but instead directly by means of the wheel flange.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is a partial cross-sectional view through a wheel of an agricultural operating device with an additional weight for a wheel;

FIG. 3 is a front side of a first loading disk;

FIG. 4 is a rear side of a first loading disk;

DETAILED DESCRIPTION

Figure 1:
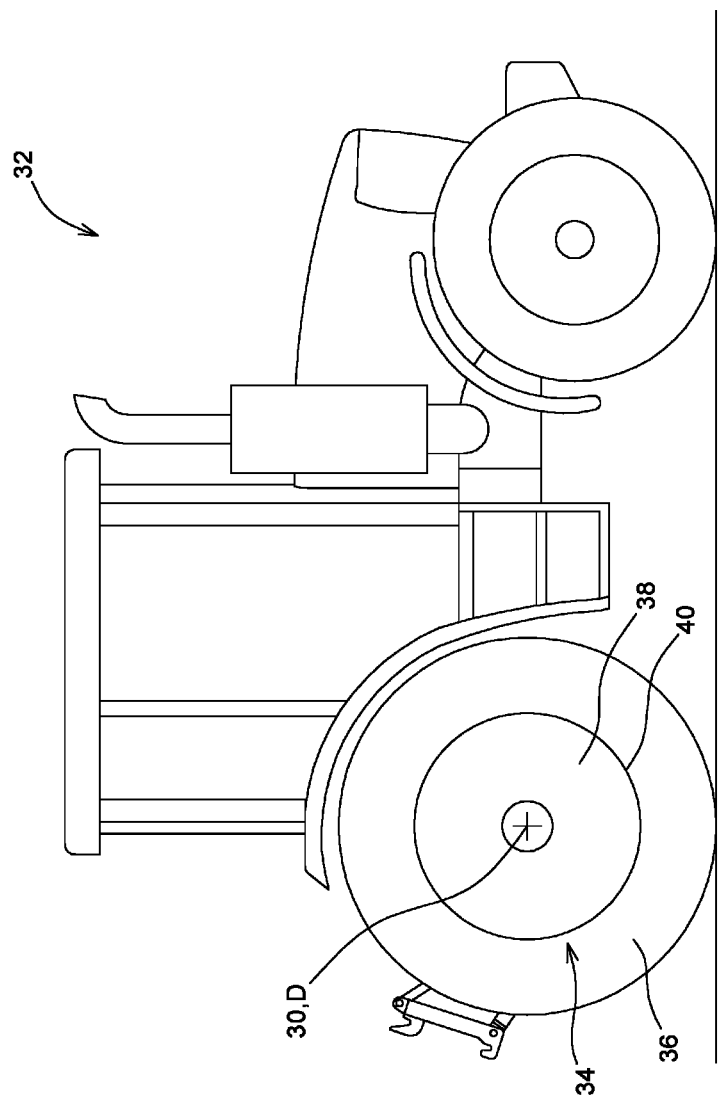
FIG. 1 is a side view of an agricultural working device.
Figure 7:
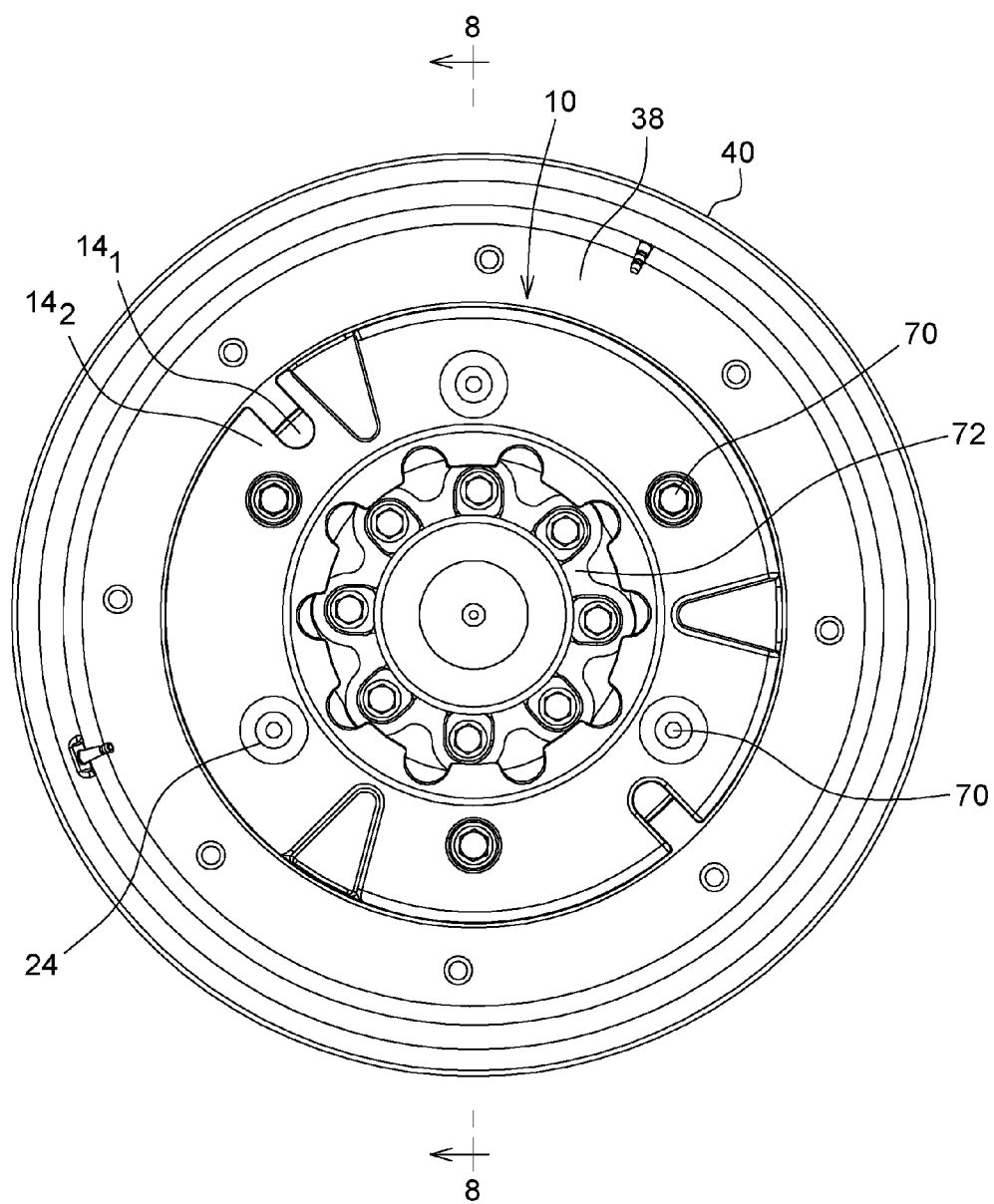
FIG. 7 is an axial view of an additional weight for a wheel arranged in the wheel of an agricultural working device.

FIG. 1 shows an agricultural working machine 32 in the form of a tractor with a drive axle 30, which in this instance is the rear axle of the working machine 32. The drive axle 30 may be driven about a rotation axis D. The drive axle 30 carries at both sides a wheel 34 with a tire 36 mounted thereon. The wheel 34 comprises a wheel disk 38 and a rim 40 which is fitted thereto. There is retained inside the rim 40 an additional weight for a wheel 10, including a first loading disk 12, a second loading disk 14 and, where applicable, an additional loading disk, as shown in FIG. 7 and described in greater detail below.

Figure 5:
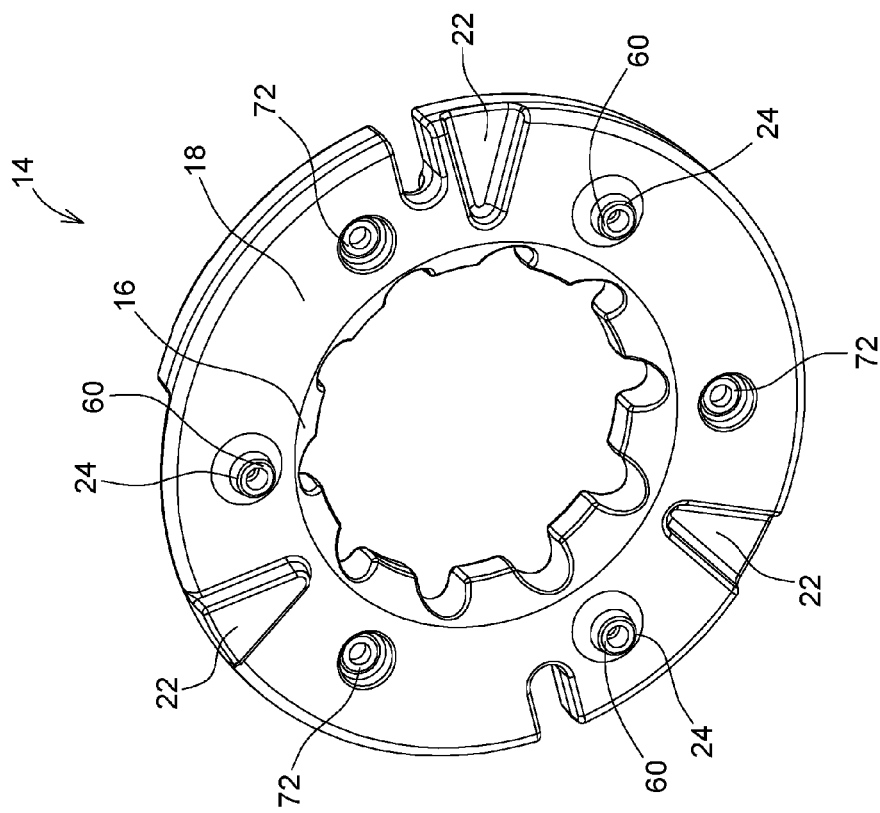
FIG. 5 is a front side of a second loading disk.

FIGS. 2 and 5 show a cross-section through the wheel disk 38 with the rim 40 which is retained thereon by means of a screwing ring 42. Furthermore, a wheel securing flange 44 is shown. An illustration of a housing which surrounds the wheel securing flange 44 and which may be a gear housing or a differential housing is omitted. The wheel securing flange 44 includes a securing hole circle 46 in which wheel nuts 48 can be screwed parallel with the rotation axis D in order to retain the wheel 34 on the wheel securing flange 44.

In FIGS. 2 and 5 it can further be seen that a first loading disk 12 is retained on the wheel securing flange 44 by means of the wheel nuts 48. To this end, the first loading disk 12 has a securing hole circle 50 which corresponds to the securing hole circle 46 of the wheel securing flange 44 in terms of the number of holes and diameter. A centering of the first loading disk 12 with respect to the wheel securing flange 44 is carried out in that the securing hole circle 50 of the first loading disk 12 is arranged concentrically relative thereto and a balancing of the first loading disk 12 with respect to the securing hole circle 50 is carried out during the production process.

A second loading disk $14_1$ is secured centrally to the first loading disk 12 and a third loading disk $14_2$ is secured to the second loading disk $14_1$. In this instance, the first loading disk 12 acts as an adapter disk of the additional weight 10 for a wheel with respect to the wheel 34. The second loading disk $14_1$ and the third loading disk $14_2$ may be constructed substantially similar, as is the case in this instance. For the purposes of this disclosure, it is assumed that in the assembled state a rear side of the first loading disk 12 is directed counter to the wheel disk 38 and a front side of the first loading disk 14 is directed counter to a rear side of the second loading disk $14_1$ so that in turn a front side of the second loading disk $14_1$ is directed counter to a rear side of the third loading disk $14_2$. Provision may be made for the assembly of other loading disks 14 but is not illustrated.

While the positioning and centering of the first loading disk 12 with respect to the wheel securing flange 44 is carried out as described above by means of the wheel nuts 48 and the securing hole circles 46, 50, the mutual positioning and centering of the loading disks 12, 14 is initially carried out via the cooperation of conical abutment faces 16 for a pre-positioning during assembly, subsequently by means of encoding formations 22 for the positioning in a radial direction or centering and finally by means of spacer domes 24 for the positioning in an axial direction.

In order to pre-position in a radial direction when the second loading disk $14_1$ is assembled with respect to the first loading disk 12 and during the subsequent assembly of the third loading disk $14_2$ with respect to the second loading disk $14_1$, the loading disk 12 has at the front side (FIG. 3) and the loading disks $14_1$, $14_2$ have at the front side (FIG. 5) and rear side (FIG. 6) conical abutment faces 16. As shown in FIG. 2, there may be provision for the conical abutment faces 16 not to contact each other in an assembled state of the first and second loading disks 12, $14_1$.

For positioning in a radial direction or centering during assembly of the loading disks 12, $14_1$, $14_2$, the loading disk 12 has at the end face 18 of the front side (FIG. 3) and the loading disks $14_1$, $14_2$ have at the end face 18 of the front side (FIG. 4) and the end face 20 of the rear side (FIG. 5) encoding formations 22. In this embodiment, three encoding formations 22 are provided on the front sides or rear sides. With the three encoding formations 22 on the front sides, two encoding formations 22 provide recesses in the end face 18 and the third encoding formation 22 a protrusion beyond the end face 20. The encoding formations 22 are constructed in a triangular manner. In this instance, the triangular encoding formations 22 are constructed as isosceles triangles and orientated in such a manner on the end face 18 that the angle which is enclosed by the two sides of the same length is directed in a radial direction or toward the center of the loading disk 12, $14_1$, $14_2$. The side of the triangle which is enclosed by the base angles may coincide with the outer edge of the loading disk 12, $14_1$, $14_2$ so that the encoding formations 22 extend as far as their radially outer edge region of the end faces 18, 20. As a result of the encoding formations 22, it is ensured that the loading disks 12, 14 can be mounted with respect to each other, on the one hand, only with the rear side on the front side and, on the other hand, only in a defined peripheral position. Furthermore, in the assembled state of the loading disks 12, $14_1$, $14_2$, the complementary encoding formations 22 engage in each other in a positive-locking manner.

For positioning in an axial direction when the loading disks 12, $14_1$, $14_2$ are assembled, the loading disks $14_1$, $14_2$ have spacer domes 24 on the end face 18 of the front side. In this embodiment, three spacer domes 24 are provided on the front sides of the loading disks 12, $14_1$, $14_2$. The spacer domes 24 include tapering or conical protrusions beyond the end face 18. Through-holes 64 extend through the spacer domes 24 in an axial direction. A threaded portion 66 is formed in the through-holes 64.

Figure 8:
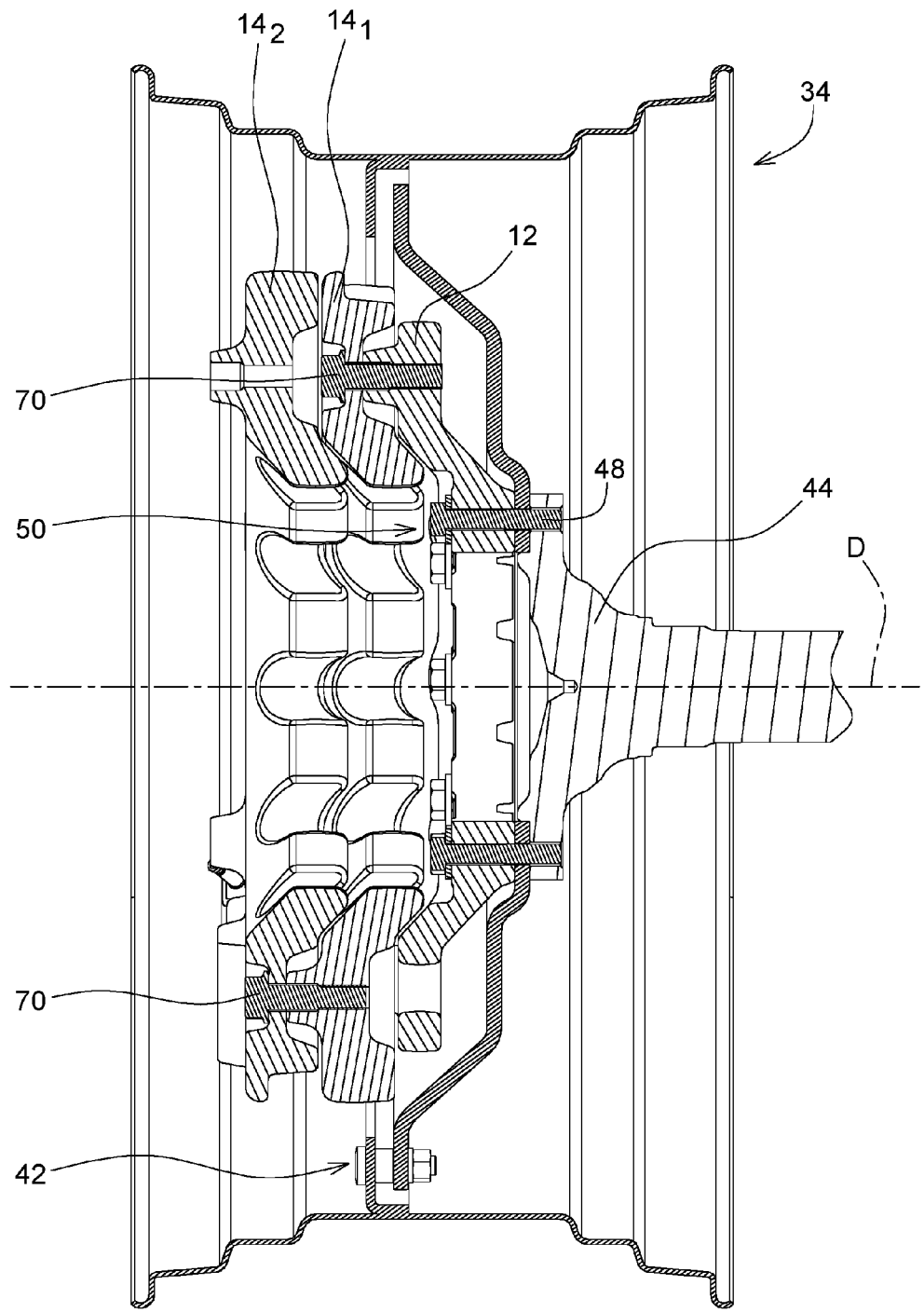
FIG. 8 is a cross-section through a wheel of an agricultural working device with an additional weight for a wheel.

As a counter-piece with respect to the spacer domes 24, the loading disks $14_1$, $14_2$ have at the respective rear side (FIG. 6) first recesses 58, wherein the recesses 58 may be constructed, as in this instance, in a round manner. Through-holes 68 extend through the recesses 58 in an axial direction. The first recesses 58 serve, in the mounted state of the loading disks 12, 14, to receive the spacer domes 24 of the first loading disk 12, as can be seen in FIGS. 2 and 8.

Figure 6:
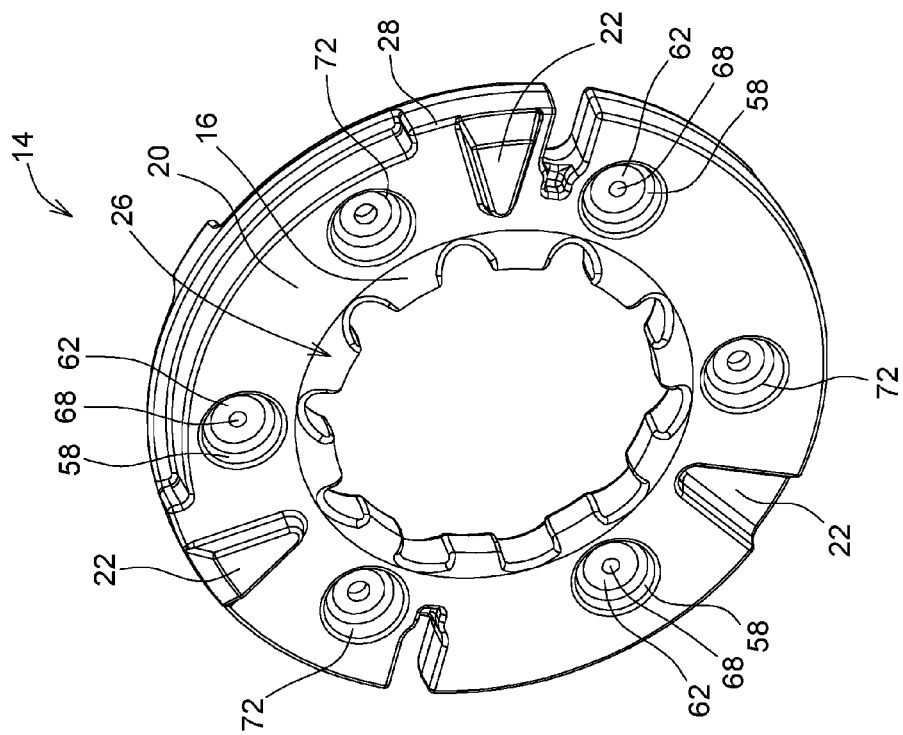
FIG. 6 is a rear side of a second loading disk.

In the assembled state of the loading disks 12, 14, an abutment face 60 of the spacer domes 24 moves into abutment with a base face 62 of the first recesses 58 so that a clear positioning of the two loading disks 12, 14 with respect to each other in an axial direction is thereby carried out. In FIG. 6, these first three recesses 58 for receiving the spacer domes 24 in the assembled state in an anti-clockwise direction are arranged beside each other adjacent to the encoding formations 22. As can be seen in FIGS. 2 and 8, an assembly of the first and second loading disk 12, $14_1$ is carried out by means of a securing screw 70 which engages through the through-hole 68 of the second loading disk 14 into the threaded portion 66 of the through-hole 64 of the first loading disk 12. In FIGS. 2 and 8, it is shown in the end face 18 of the front side of the loading disk 14 second recesses 72 in which the head of the securing screw 70 is at least partially recessed in the screwed state. Furthermore, there are arranged in the end face 20 of the rear side of the loading disk 14 third recesses 74 which, when a third loading disk 14₂ is assembled, as shown in FIG. 2, serves to receive the head of the fixing screw 70 projecting above the end face 18.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An additional weight for a wheel for ballasting a drive axle of an agricultural working machine, comprising:
 a first loading disk centrally connected to the drive axle, where the drive axle acts as an adapter element; and
 at least one second loading disk connected to the first loading disk;
 wherein, the first loading disk has a conical abutment face for pre-positioning the second loading disk relative to the first loading disk; and
 wherein, the first and the second loading disks form encoding formations for mutually centering on end faces which face each other and which are in engagement with each other in a connected state of the loading disks, and the encoding formations in the end faces form a triangular shape;
 wherein, at least one of the end faces of at least one of the loading disks forms a spacer dome, where in the connected state the spacer dome contacts an end face of the other loading disk in order to position the first and the second loading disks with respect to each other in an axial direction.

2. The additional weight of claim 1, wherein the first and second loading disks form on at least one of the end faces spacer domes via which the loading disks contact each other in the connected state.

3. The additional weight of claim 1, wherein the encoding formations are constructed partially as recesses and partially as protrusions.

4. The additional weight of claim 1, wherein a through-hole extends through the spacer domes.

5. The additional weight of claim 1, wherein the first loading disk has a securing hole circle for securing to a wheel flange of the drive axle.

* * * * *